United States Patent
Ohshita

Patent Number: 5,113,288
Date of Patent: May 12, 1992

[54] BEHIND STOP WIDE ANGLE LENS SYSTEM

[75] Inventor: Koichi Ohshita, Tokyo, Japan

[73] Assignee: Nikon Corporation, Tokyo, Japan

[21] Appl. No.: 679,252

[22] Filed: Apr. 2, 1991

[30] Foreign Application Priority Data

Apr. 4, 1990 [JP] Japan .................. 2-90008
Apr. 4, 1990 [JP] Japan .................. 2-90009

[51] Int. Cl.⁵ .................. G02B 9/56; G02B 13/04
[52] U.S. Cl. .................. 359/739; 359/753
[58] Field of Search ............. 359/739, 740, 781, 785, 359/672, 673, 674, 675, 753

[56] References Cited

U.S. PATENT DOCUMENTS

2,725,789 12/1965 Schlegel .................. 359/753

FOREIGN PATENT DOCUMENTS

60-37514 2/1985 Japan.

Primary Examiner—Bruce Y. Arnold
Assistant Examiner—Rebecca D. Gass
Attorney, Agent, or Firm—Shapiro and Shapiro

[57] ABSTRACT

A behind stop wide angle lens system comprises a negative meniscus lens $L_1$ having a convex surface directed to the object, a positive meniscus lens $L_2$ having a convex surface directed to the object, a double-side-concave negative lens $L_3$ having both surfaces concaved, a double-side-convex positive lens $L_4$ having both surfaces convexed, and a stop S. These lenses are arranged in the mentioned order from the end adjacent the object. The lenses satisfying the following conditions (1) to (4):

$$-2.8f < f1 < -1.3f \quad (1)$$

$$0.7f < f2 < 0.82f \quad (2)$$

$$1.5 < r1/r2 < 2.3 \quad (3)$$

$$0.13 < r3/r4 < 0.4 \quad (4)$$

wherein f represents the focal distance of the whole lens system, f1 represents the focal distance of the negative meniscus lens $L_1$, f2 represents the focal distance of the positive meniscus lens $L_2$, r1 and r2 respectively represent the radii of curvature of the object-side surface and the image-side surface of the negative meniscus lens $L_1$, and r3 and r4 respectively represent the radii of curvature of the object-side surface and the image-side surface of the positive meniscus lens $L_2$. With this arrangement, it is possible to obtain a wide view angle while attaining superior image forming performance.

15 Claims, 9 Drawing Sheets

BEHIND STOP WIDE ANGLE LENS SYSTEM

BACKGROUND OF THE INVENTION

1. Field of the Invention

The present invention relates to a photographing lens system suitable for use in a compact lens-shutter type camera and, more particularly, to a photographing lens system having a wide view angle.

2. RELATED BACKGROUND ART

Behind shutter tessar type lens and tripplet type lens are known as photographing lens for compact lens-shutter type camera. These photographing lenses are advantageous in that they have superior performance despite very simple constructions and in that they enable focusing mechanism to be simplified in construction because the stop is located close to the image. Another advantage is that the focal distance of the whole lens system can easily be increased by attaching a rear converter to the image side of these lens systems.

In recent years, there is a diversified demand for lens-shutter type cameras. For instance, there is in one hand an increasing demand for photographing lens system having wider angles, while on the other hand multi-focus lens systems and large-diameter lenses are required. The tessar-type lens and tripplet-type lens, however, have view anglers which are about 65° at the greatest and cannot be regarded as being wide angle lenses.

Hitherto, so-called Biogon type lens and retro-focus-type lens have been known as wide angle lenses. These lenses, however, are quite complicated in construction and cannot suitably be used as photographing lens system for lens-shutter-type camera, considering cost and lens size.

In these known wide angle lenses, stop is incorporated in the optical system so that the focusing mechanism of the camera is impractically complicated. Furthermore, it is not easy to mount a rear converter on these known wide angle lenses, making it difficult to design and construct a two-focus camera.

SUMMARY OF THE INVENTION

Accordingly, an object of the present invention is to provide a behind stop wide angle lens system which is simple in construction but yet capable of reducing the lens size and increasing the picture angle, thereby overcoming the above-described problems of the prior art.

To this end, according to the present invention, there is provided a lens system comprising, from the end adjacent the object, a negative meniscus lens having convexed surface directed towards the object, a positive meniscus lens having convexed surface directed towards the object, a negative lens having both surfaces concaved, a positive lens having both surfaces convexed, and a stop.

The above and other objects, features and advantages of the present invention will become clear from the following description of the preferred embodiments when the same is read in conjunction with the accompanying drawings.

DESCRIPTION OF THE PREFERRED EMBODIMENTS

The lens system of the present invention is basically a so-called inverse telephoto-type having a front lens group ($L_1$) having a negative refractive power and a rear lens group ($L_2$ to $L_4$) having a positive refractive power.

Conventionally, inverse telephoto-type lenses have been intended for providing a long back focus as compared with focal distance and, hence, offers an advantage in that it provides a sufficiently large marginal luminance. This type of lens, however, is not suitable for use in a lens-shutter-type camera because the overall length and, hence, back focus of the lens are too large.

If the stop of this conventional inverse telephoto-type lens is shifted to the rear side of the lens so as to form a behind stop type lens system, the performance is seriously degraded due to insufficiency of the extra-axis light beam and due to a large astigmatism.

According to the invention, powers and geometries of some of the lenses of the lens system are determined to meet specific conditions, thereby providing a lens system which is of behind stop type but yet capable of widening the view angle and reducing the size, as well as improving image-forming performance. There are two types of behind stop wide angle lens system of the present invention.

The basic arrangement of the first type (referred to Type I, hereinafter) of the lens system of the present invention meets the following four conditions.

$$-2.8f < f1 < -1.3f \tag{1}$$

$$0.7f < f2 < 0.82f \tag{2}$$

$$1.5 < r1/r2 < 2.3 \tag{3}$$

$$0.13 < r3/r4 < 0.4 \tag{4}$$

wherein f represents the focal distance of the whole lens system, f1 represents the focal distance of th negative meniscus lens $L_1$, f2 represents the focal distance of the positive meniscus lens $L_2$, r1 and r2 respectively represent the radii of curvature of the object-side and image-side surfaces of the negative meniscus lens $L_1$, and r3 and r4 are radii of curvature of the positive meniscus lens $L_2$.

The basic arrangement of the second type (referred as type II hereinafter) of the lens system in accordance with the present invention meets the following five conditions.

$$-1.9f < f1 < -1.2f \tag{101}$$

$$0.6f < f2 < 0.74f \tag{102}$$

$$0.1 < r3/44 < 0.28 \tag{103}$$

$$2.5 < d3/d7 < 3.8 \tag{104}$$

$$0.17f < d2 < 0.37f \tag{105}$$

wherein d3 represents the thickness of the positive meniscus lens $L_2$ as measured on the optical axis of the lens, while d7 represents the thickness of the positive lens $L_4$ as measured on the optical axis of this lens.

Type I and type II of the lens system in accordance with the present invention will be described separately.

Description of Lens System of Type I

In the lens system of the type I, the refractive power of the negative meniscus lens $L_1$ which forms the front lens group $L_1$ is determined to be comparatively small as shown by the condition (1). At the same time, the refractive power of the positive meniscus lens $L_2$ which is the closest to the object among the lenses of the rear lens group ($L_2$ to $L_4$) is also weakened, so as to maintain the required back focus and to attain a compact construction. At the same time distortion and astigmatism as the factors which hamper the widening of the view angle are suitably corrected.

If the focal distance f1 is below the lower limit of the condition (1), it becomes difficult to maintain a suitable back focus so that the marginal illumination is reduced. Conversely, when the upper limit of this condition is exceeded, it becomes difficult to correct aberrations, in particular the negative distortion.

The condition (2) is for correcting distortion and astigmatism. When the upper limit of this condition is exceeded, it becomes difficult to correct distortion. Conversely, when f2 is below the lower limit of the condition (2), it becomes difficult to correct astigmatism, with the result that the required back focus cannot be obtained.

The conditions (3) and (4) determine optimum ratios between the object side and the image side of the negative and positive meniscus lenses $L_1$ and $L_2$, respectively, in order to correct the distortion and astigmatism, which are factors impeding widening of the view angle, at a good balance with each other.

More specifically, the condition (3) is for correcting distortion and comatic aberration with a good balance with each other. When the upper limit of the condition (3) is exceeded, it becomes difficult to correct distortion, whereas, when the ratio r1/r2 is below the lower limit of this condition, it becomes difficult to correct comatic aberration.

On the other hand, the condition (4) is for correcting astigmatism with a good balance. When the ratio r3/r4 is below the lower limit of the condition (4), the curvature of th image side of the positive meniscus lens $L_2$ becomes small so that negative astigmatism is generated to cause the longitudinal image surface to largely concave towards the object. Conversely, when the upper limit of the condition (4) is exceeded, the curvature of the image side surface of th positive meniscus lens $L_2$ is enhanced to generate a positive astigmatism, with the result that the longitudinal image surface strongly projects towards the object. Thus, the image forming performance is seriously degraded when at least one of these conditions fails to be met.

In order to obtain a compact configuration, it is preferred that the following condition (5) is also met.

$$0.4f < d2 < 0.55f \quad (5)$$

where d2 represents the size of the air gap between the negative meniscus lens $L_1$ and the positive meniscus lens $L_2$ as measured on the optical axis of these lenses. Increase of the gap size d2 in excess of the upper limit of the condition (5) is advantageous from the view point of preservation of th back focus but undesirably increases the size of the lens system because the height of the light rays of the maximum view angle incident to the negative meniscus is increased undesirably. On the other hand, when the air gap size d2 is below the lower limit of the condition (5), the back focus length becomes too short, making it difficult to preserve the marginal illumination.

In order to improve the image forming performance in the marginal region, it is necessary to correct not only astigmatism and coma aberration but also to correct the curvature of the image surface. In particular, it is desirable that the following condition (6) is met.

$$1.77 < n4 \quad (6)$$

wherein n4 represents the refractive index of the double-side-convex positive lens $L_4$ with respect to the d ray ($\lambda = 587.6$ nm). If the refractive index n4 is below the lower limit of this condition, Petzval sum becomes positive to undesirably make it difficult to correct the curvature of image.

In order to attain sufficient correction of the coma aberration and astigmatism, it is necessary that the conditions (7) and (8) are also met:

$$-1.5 < r7/r8 < -0.7 \quad (7)$$

$$0.17f < d3 < 0.36f \quad (8)$$

$$0.01f < d6 < 0.026f \quad (9)$$

wherein f represents the focal distance of the whole lens system, r7 and r8 represent the radii of curvatures of the object-side and image-side surfaces of the double-side-convex positive lens $L_4$, d3 represents the thickness of the positive meniscus lens $L_2$ as measured on the optical axis, and d6 represents the air gap size between the double-side-concave negative lens $L_3$ and the double-side-convex positive lens $L_4$ as measured on the optical axis.

Conditions (7) and (8) relate to correction of coma aberration.

The ratio r7/r8 exceeding the upper limit of the condition (7) causes an increase in the inward coma aberration, whereas, when this ratio is below the lower limit of the condition (7), outward coma aberration becomes excessively large, with the result that the performance is degraded in full-aperture exposure.

In the case of a lens system having a wide angle such as the lens system of the present invention, correction of the coma aberration at a certain view angle does not always mean that coma aberration is corrected at other view angles. The condition (8) is for attaining appreciable correction over the entire range of view angle, i.e., to effectively correct coma aberration at the central region while the coma aberration at the marginal region has been sufficiently corrected.

It is impossible to effect an appreciable correction of inward coma aberration in the intermediate view angle region when the lens thickness d3 is below the lower limit of the condition (8). Conversely, when the upper limit of the condition (8) is exceeded, the outward coma aberration becomes remarkable to undesirably require greater size of the lens system.

In order to correct the coma aberration sufficiently and with a good balance over the entire range of view angle, it is preferred that the lower limit of the condition (7) and the lower limit of the condition (8) are respectively set to $-1.1$ and 0.25 f. In particular, equalizing the curvatures of both sides of the positive lens $L_4$, i.e., setting the ratio of the condition (7) to $-1.0$, provides an advantage from the view point of production of the lens.

The condition (9) pertains to correction of spherical aberration. Only insufficient correction of spherical aberration is possible when the upper limit of the condition (9) is exceeded, whereas, when the air gap size d6 is below the lower limit of the condition (9), spherical aberration is corrected excessively. Thus, the image forming performance is degraded when the condition (9) is not met. In order to correct spherical aberration more sufficiently and with a good balance, the upper limit of the condition (9) is preferably set to 0.017 f.

In order to correct color aberration with a good balance, it is preferred that the following conditions (10) and (11) are met:

$$51 < \nu1 < 70 \tag{10}$$

$$-2 < \nu2 - \nu4 < 8 \tag{11}$$

wherein $\nu1$ is the Abbe number of the negative meniscus lens $L_1$, while $\nu2$ and $\nu4$ respectively represent th Abbe numbers of the positive meniscus lens $L_2$ and the double-side-convex lens $L_4$.

The condition (10) is mainly intended for suppressing the magnification color aberration caused by view angle. In the case of a retro-focus type lens system such as the lens system of the present invention, the angle of the extra-axis light rays incident to the rear lens group ($L_2$ to $L_4$) is reduced due to the action of the negative lens of the front lens group ($L_1$), so that any fluctuation of the magnification color aberration due to view angle can be efficiently corrected. However, when the Abbe number $\nu1$ is above or below the upper and lower limits of the condition (10), it becomes difficult to correct fluctuation of the magnification color aberration.

The condition (11) is intended for correction the color aberration on the axis and out of the axis with good balance. When the upper limit of this condition is exceeded, correction of the color aberration in the region out of the axis becomes insufficient as compared with that on the axis. Conversely, when the difference ($\nu2 - \nu4$) is below the lower limit of the condition (11), correction of color aberration becomes excessively large in the region out of the axis.

In order to reduce the production cost, it is desirable that the following conditions are met:

$$-0.01 < n4 - n2 < 0.09 \tag{12}$$

wherein n2 and n4, respectively, are refractive index values of the positive meniscus lens $L_2$ and the double-side-convex positive lens $L_4$ with respect to the d rays ($\lambda = 587.6$ nm).

Lenses which are suitable for mounting in cameras, such as the lens system of the present invention, it is desirable not only that the image forming performance is superior but also that the production cost is low.

In the cases of the lens systems such as the lens system of the present invention, it is desirable that the positive lens has a refractive index which is as large as possible. Use of glasses having large refractive index, however, raises the cost uneconomically.

According to the invention, correction of image curvature is corrected to improve the performance without substantially raising the cost, by increasing the refractive index of the double-side-convex lens $L_4$ which makes a greater contribution to the correction of image curvature while setting comparatively low the refractive index of the positive meniscus lens $L_2$ which does not make large contribution to the correction of image curvature.

When the upper limit of the condition (12) is exceeded, it is difficult to correct the image curvature. Conversely, when the difference (n4−n2) is below the lower limit of the condition (12), the cost of the glass material is raised undesirably.

Preservation of a large back focus is desirable for realizing a multi-focus system with the aid of a rear converter and is necessary for obtaining sufficiently large marginal illumination.

A too large back focus, however, increases the size of the lens system, failing to meet the object of the invention. In order to obtain a lens system suitable for use in a lens-shutter type camera, therefore, it is preferred that the following condition (13) is met:

$$0.9f < Bf < 1.1f \tag{13}$$

wherein f and Bf respectively represent the focal distance of the whole lens system and the length of the back focus.

When the back focus lens Bf is reduced below the lower limit of the condition (13), it becomes difficult to obtain required marginal luminance and to provide a mount mechanism for a rear converter. Conversely, when the upper limit of the condition (13) is exceeded, the size of the lens system is undesirably increased.

Data of embodiments belonging to type I of the lens system of the present invention are shown below.

The lens systems of these embodiments have wide angles of 73.9° to 91.2°. Each of these embodiments is basically composed of a negative meniscus lens $L_1$ having a convexed surface directed to the object, a positive meniscus lens $L_2$ having a convex surface directed towards the object, a negative lens $L_3$ with both sides concaved, a positive lens $L_4$ with both sides convex, and a stop S, as viewed from the end adjacent to the object.

Figure 1:
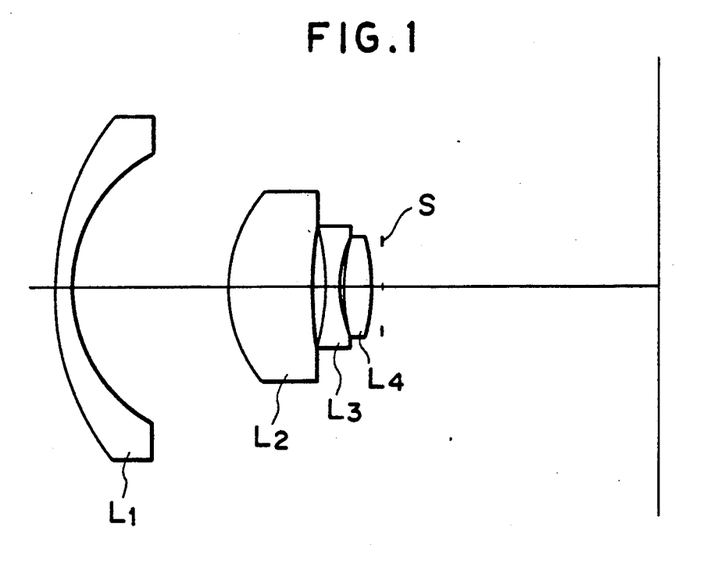
FIGS. 1 to 18 are illustrations of lens arrangements of first to eighteenth embodiments of the lens system in accordance with the present invention.
Figure 2:
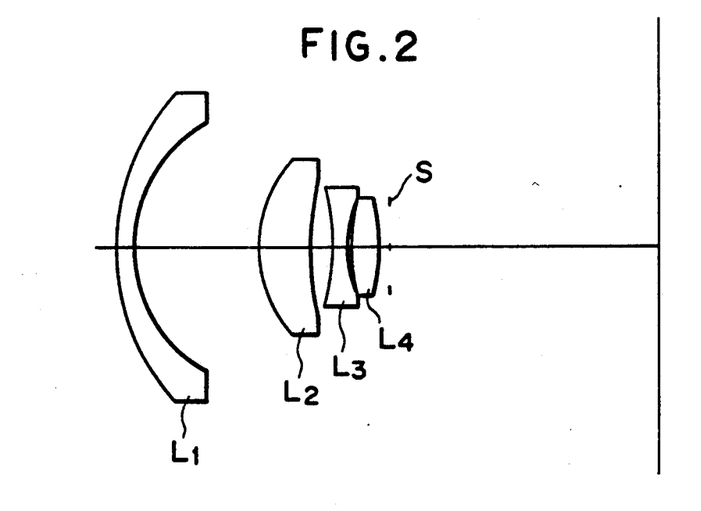
Figure 3:
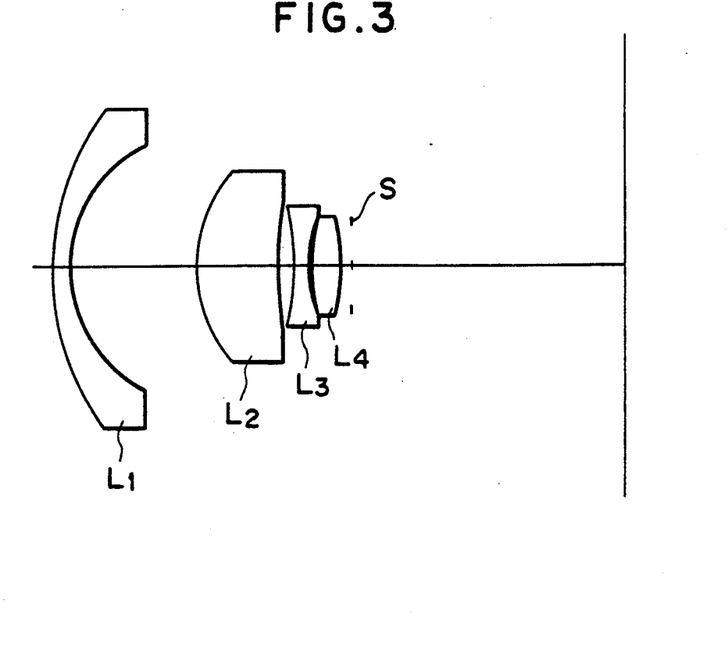
Figure 4:
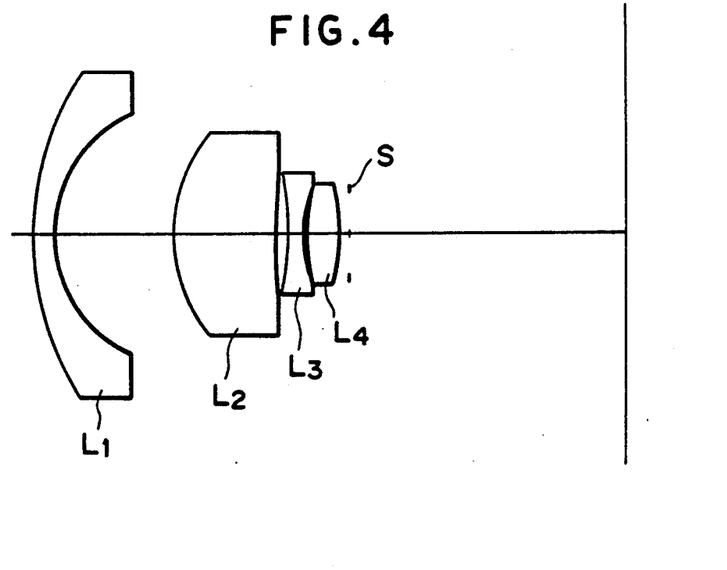
Figure 5:
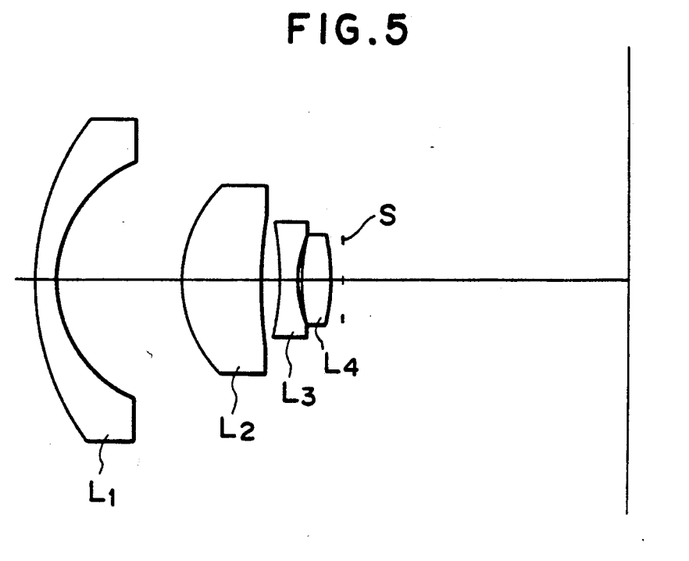
Figure 6:
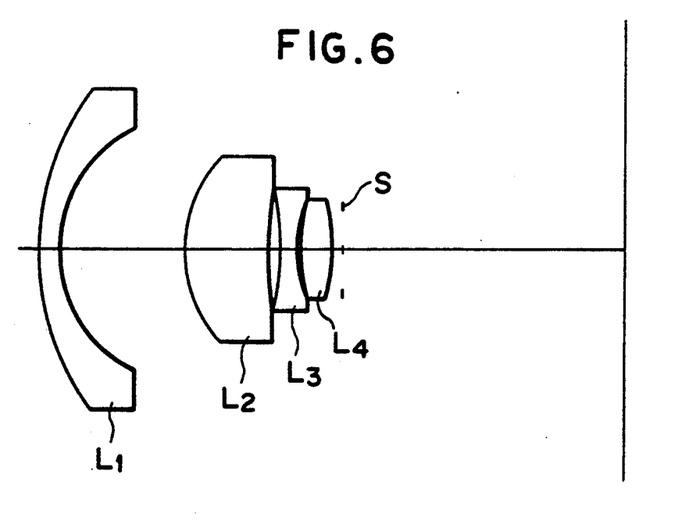
Figure 7:
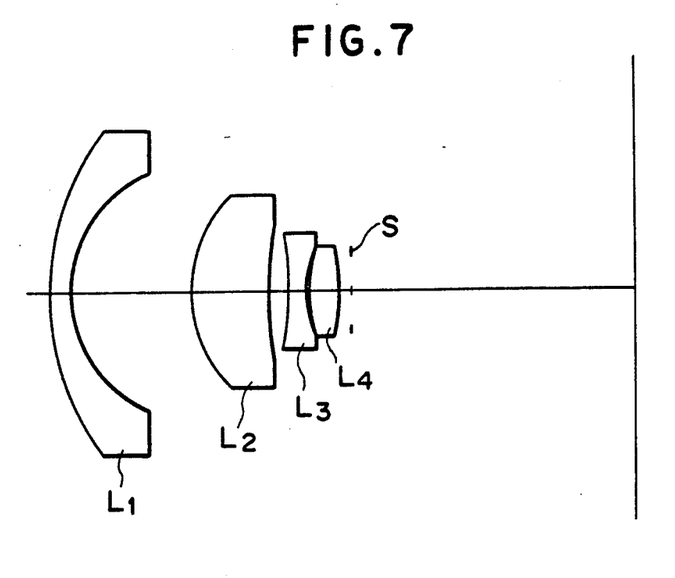
Figure 8:
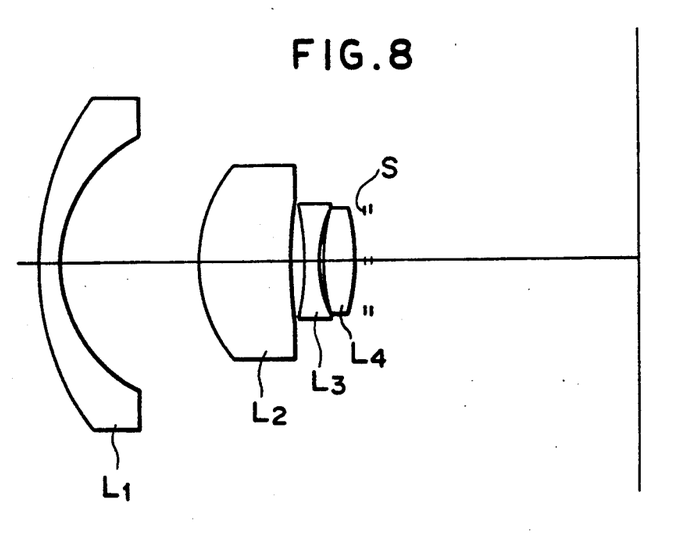
Figure 9:
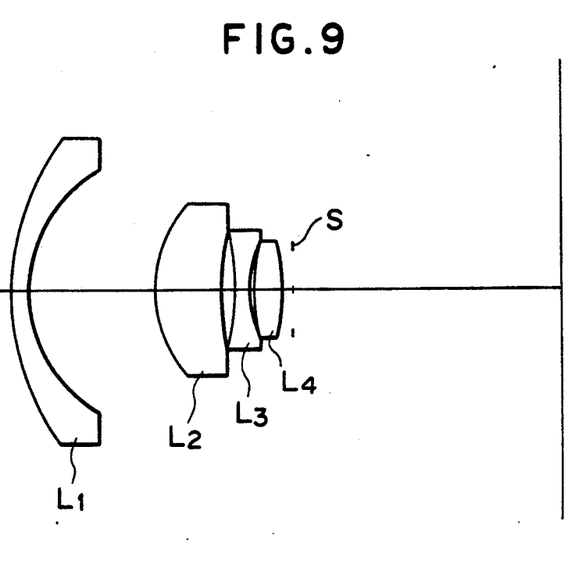
Figure 10:
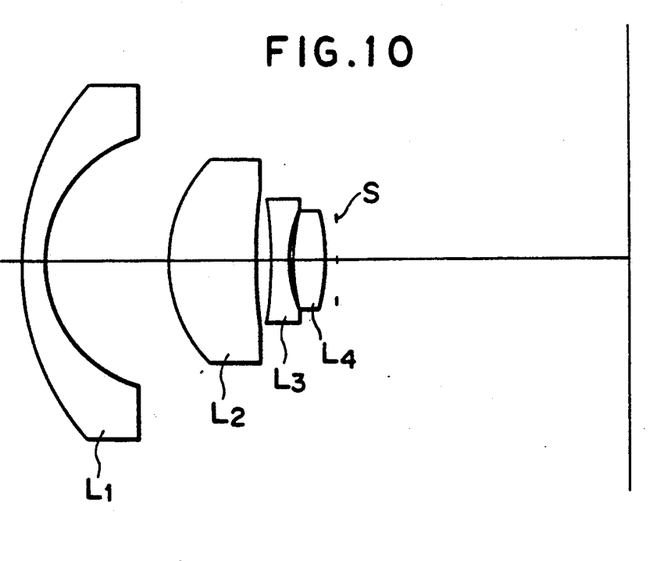
Figure 11:
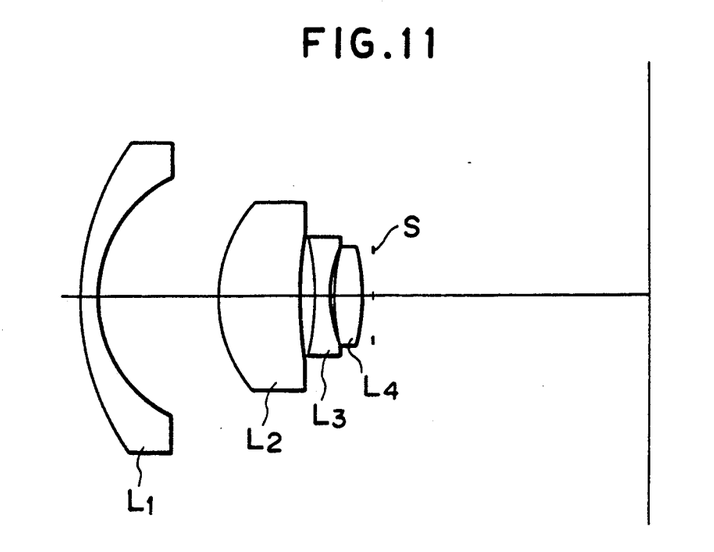
Figure 12:
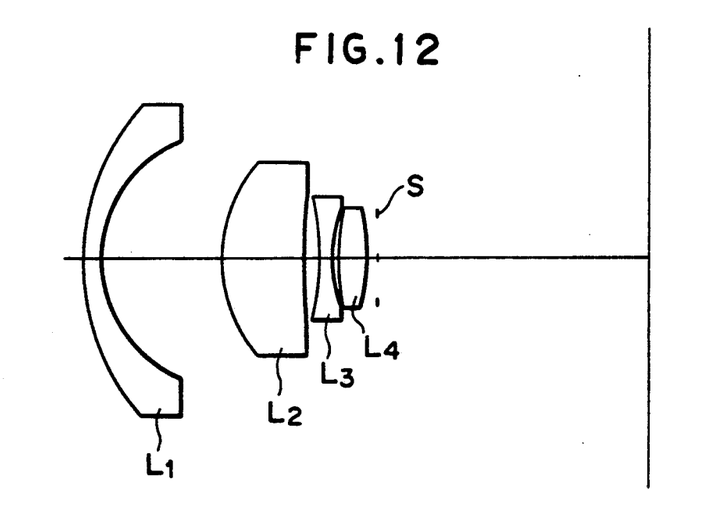

Data of first to twelfth embodiments of type I of the lens system of the present invention are shown in Tables 1 to 12, while constructions of these lens systems are shown in FIGS. 1 to 12, respectively.

Numerals appearing on left ends of lines in Tables show the orders of the lens as counted from the end adjacent to the object. A symbol r represents the radius of curvature of the lens surface, d represents the lens surface distance, $\nu$ represents the Abbe number, n represents the refractive index with respect to the d ray ($\lambda = 587.6$ nm), f represents the focal distance of the whole lens system, Bf represents the length of the back focus, FN represents the F number and 2A represents the view angle.

TABLE 1

| (First Embodiment) |||||
| f = 100.00 | Bf = 94.400 | FN = 3.50 | 2A = 73.9° ||
| No | r | d | $\nu$ | n |
|---|---|---|---|---|
| 1 | 91.9241 | 5.5944 | 54.62 | 1.51454 |
| 2 | 50.1105 | 52.4479 | | |
| 3 | 48.5360 | 27.9722 | 47.53 | 1.78797 |
| 4 | 159.4850 | 4.1958 | | |
| 5 | −88.1650 | 4.8951 | 30.09 | 1.69895 |
| 6 | 43.5730 | 1.3986 | | |
| 7 | 69.7977 | 9.0910 | 45.42 | 1.79668 |
| 8 | −68.1222 | (Bf) | | |

TABLE 2

(Second Embodiment)
f = 100.00    Bf = 92.658    FN = 3.50    2A = 74.3°

| No | r | d | ν | n |
|---|---|---|---|---|
| 1 | 77.1159 | 5.5944 | 58.96 | 1.51823 |
| 2 | 47.3703 | 41.9583 | | |
| 3 | 42.8583 | 17.4826 | 49.44 | 1.77279 |
| 4 | 111.9966 | 6.9931 | | |
| 5 | −81.5586 | 5.2448 | 30.09 | 1.69895 |
| 6 | 42.9332 | 1.3986 | | |
| 7 | 69.6306 | 9.4406 | 43.30 | 1.84042 |
| 8 | −67.8250 | (Bf) | | |

TABLE 3

(Third Embodiment)
f = 100.00    Bf = 94.569    FN = 3.50    2A = 74.0°

| No | r | d | ν | n |
|---|---|---|---|---|
| 1 | 89.3604 | 5.5954 | 54.62 | 1.51454 |
| 2 | 45.1011 | 42.3149 | | |
| 3 | 47.3539 | 27.9768 | 47.53 | 1.78797 |
| 4 | 172.3600 | 4.5462 | | |
| 5 | −91.0352 | 4.8959 | 30.09 | 1.69895 |
| 6 | 42.1254 | 1.3988 | | |
| 7 | 67.5332 | 9.4422 | 45.42 | 1.79668 |
| 8 | −67.5332 | (Bf) | | |

TABLE 4

(Fourth Embodiment)
f = 100.00    Bf = 96.146    FN = 3.50    2A = 74.4°

| No | r | d | ν | n |
|---|---|---|---|---|
| 1 | 97.0464 | 6.9932 | 52.16 | 1.51742 |
| 2 | 43.5488 | 40.2109 | | |
| 3 | 52.7053 | 34.9660 | 46.54 | 1.80420 |
| 4 | 269.3775 | 3.8463 | | |
| 5 | −108.8345 | 5.2449 | 28.31 | 1.72825 |
| 6 | 46.7265 | 1.3986 | | |
| 7 | 77.3759 | 10.4898 | 43.30 | 1.84042 |
| 8 | −72.8707 | (Bf) | | |

TABLE 5

(Fifth Embodiment)
f = 100.00    Bf = 100.02    FN = 4.00    2A = 81.5°

| No | r | d | ν | n |
|---|---|---|---|---|
| 1 | 91.0710 | 7.0585 | 57.03 | 1.62280 |
| 2 | 43.5699 | 41.1747 | | |
| 3 | 46.6082 | 26.4694 | 47.53 | 1.78797 |
| 4 | 199.6663 | 5.6860 | | |
| 5 | −113.3461 | 5.8821 | 28.34 | 1.72825 |
| 6 | 39.5810 | 1.2548 | | |
| 7 | 58.9308 | 9.8035 | 40.92 | 1.79631 |
| 8 | −73.9137 | (Bf) | | |

TABLE 6

(Sixth Embodiment)
f = 100.00    Bf = 95.903    FN = 3.50    2A = 74.8°

| No | r | d | ν | n |
|---|---|---|---|---|
| 1 | 88.5563 | 6.9930 | 64.12 | 1.51680 |
| 2 | 45.2266 | 41.9580 | | |
| 3 | 45.7808 | 27.9720 | 53.97 | 1.71300 |
| 4 | 168.9280 | 3.8462 | | |
| 5 | −84.2192 | 5.2448 | 33.77 | 1.64831 |
| 6 | 40.9462 | 1.3287 | | |
| 7 | 63.6860 | 10.4895 | 47.53 | 1.78797 |
| 8 | −68.2237 | (Bf) | | |

TABLE 7

(Seventh Embodiment)
f = 100.00    Bf = 97.628    FN = 4.00    2A = 81.3°

| No | r | d | ν | n |
|---|---|---|---|---|
| 1 | 89.0482 | 7.0589 | 53.95 | 1.61720 |
| 2 | 43.4461 | 40.3923 | | |
| 3 | 46.1096 | 26.2746 | 47.53 | 1.78797 |
| 4 | 182.2297 | 6.2745 | | |
| 5 | −119.6036 | 5.8824 | 28.34 | 1.72825 |
| 6 | 38.2445 | 1.2549 | | |
| 7 | 55.6300 | 9.8040 | 40.92 | 1.79631 |
| 8 | −76.1873 | (Bf) | | |

TABLE 8

(Eighth Embodiment)
f = 100.00    Bf = 95.020    FN = 2.87    2A = 73.9°

| No | r | d | ν | n |
|---|---|---|---|---|
| 1 | 95.6928 | 6.9443 | 56.46 | 1.50137 |
| 2 | 46.8382 | 46.8743 | | |
| 3 | 51.2823 | 31.2496 | 46.43 | 1.80411 |
| 4 | 206.5555 | 4.1666 | | |
| 5 | −99.4250 | 5.2083 | 28.34 | 1.72825 |
| 6 | 45.6449 | 1.5278 | | |
| 7 | 75.5805 | 10.4165 | 43.30 | 1.84042 |
| 8 | −72.3744 | (Bf) | | |

TABLE 9

(Ninth Embodiment)
f = 100.00    Bf = 94.384    FN = 3.50    2A = 74.1°

| No | r | d | ν | n |
|---|---|---|---|---|
| 1 | 85.4950 | 5.5947 | 54.62 | 1.51454 |
| 2 | 46.3311 | 41.9602 | | |
| 3 | 43.6054 | 22.7285 | 45.42 | 1.79668 |
| 4 | 126.1143 | 4.1960 | | |
| 5 | −82.8641 | 4.8954 | 30.09 | 1.69895 |
| 6 | 41.2885 | 1.3987 | | |
| 7 | 68.3469 | 9.4411 | 45.42 | 1.79668 |
| 8 | −63.6569 | (Bf) | | |

TABLE 10

(Tenth Embodiment)
f = 100.00    Bf = 99.446    FN = 4.00    2A = 91.2°

| No | r | d | ν | n |
|---|---|---|---|---|
| 1 | 90.2996 | 7.4418 | 53.95 | 1.61720 |
| 2 | 43.0579 | 41.3952 | | |
| 3 | 49.3022 | 29.3022 | 47.53 | 1.78797 |
| 4 | 262.1662 | 4.8837 | | |
| 5 | −138.3203 | 6.0465 | 28.34 | 1.72825 |
| 6 | 43.6282 | 1.1628 | | |
| 7 | 71.4285 | 10.6976 | 42.97 | 1.83500 |
| 8 | −82.6741 | (Bf) | | |

TABLE 11

(Eleventh Embodiment)
f = 100.00    Bf = 94.379    FN = 3.50    2A = 74.0°

| No | r | d | ν | n |
|---|---|---|---|---|
| 1 | 89.5917 | 5.5949 | 54.62 | 1.51454 |
| 2 | 44.4841 | 40.2134 | | |
| 3 | 46.9259 | 27.9746 | 47.53 | 1.78797 |
| 4 | 174.3459 | 4.5459 | | |
| 5 | −88.7829 | 4.8955 | 30.09 | 1.69895 |
| 6 | 41.9828 | 1.3987 | | |
| 7 | 67.5156 | 9.4414 | 45.42 | 1.79668 |
| 8 | −66.3212 | (Bf) | | |

TABLE 12

(Twelfth Embodiment)
f = 100.00    Bf = 94.389    FN = 3.50    2A = 74.3°

| No | r | d | ν | n |
|---|---|---|---|---|
| 1 | 79.3692 | 5.5944 | 54.62 | 1.51454 |
| 2 | 42.4161 | 40.9091 | | |
| 3 | 49.8818 | 27.9720 | 47.53 | 1.78797 |
| 4 | 344.8199 | 4.5455 | | |
| 5 | −107.2087 | 4.8951 | 30.09 | 1.69895 |
| 6 | 46.1794 | 2.4476 | | |
| 7 | 95.9734 | 9.4406 | 47.53 | 1.78797 |
| 8 | −67.7230 | (Bf) | | |

The values of the factors of the aforementioned conditions are shown in the following Table 13 for each of the first to twelfth embodiments.

TABLE 13

| | Embodiments | | | |
|---|---|---|---|---|
| Conditions | 1 | 2 | 3 | 4 |
| (Values of factors of conditions: No. 1) | | | | |
| f1/f | −2.243 | −2.532 | −1.849 | −1.598 |
| f2/f | 0.797 | 0.809 | 0.754 | 0.760 |
| r1/r2 | 1.834 | 1.628 | 1.981 | 2.228 |
| r3/r4 | 0.304 | 0.383 | 0.275 | 0.196 |
| d2/f | 0.524 | 0.420 | 0.423 | 0.402 |
| n4 | 1.797 | 1.840 | 1.797 | 1.840 |
| r7/r8 | −1.025 | −1.027 | −1.000 | −1.062 |
| d3/f | 0.280 | 0.175 | 0.280 | 0.350 |
| d6/f | 0.014 | 0.014 | 0.014 | 0.014 |
| ν1 | 54.62 | 58.96 | 54.62 | 52.16 |
| ν2−ν4 | 2.11 | 6.14 | 2.11 | 3.24 |
| n4−n2 | 0.0087 | 0.0676 | 0.0087 | 0.0362 |
| Bf/f | 0.944 | 0.927 | 0.946 | 0.961 |

| | Embodiments | | | |
|---|---|---|---|---|
| Conditions | 5 | 6 | 7 | 8 |
| (Values of factors of conditions: No. 2) | | | | |
| f1/f | −1.422 | −1.893 | −1.461 | −1.921 |
| f2/f | 0.717 | 0.805 | 0.722 | 0.779 |
| r1/r2 | 2.090 | 1.958 | 2.050 | 2.043 |
| r3/r4 | 0.233 | 0.271 | 0.253 | 0.248 |
| d2/f | 0.412 | 0.420 | 0.404 | 0.469 |
| n4 | 1.797 | 1.788 | 1.796 | 1.840 |
| r7/r8 | −0.797 | −0.933 | −0.730 | −1.044 |
| d3/f | 0.265 | 0.280 | 0.263 | 0.312 |
| d6/f | 0.013 | 0.013 | 0.013 | 0.015 |
| ν1 | 57.03 | 64.12 | 53.95 | 56.46 |
| ν2−ν4 | 6.61 | 6.44 | 6.61 | 3.13 |
| n4−n2 | 0.0083 | 0.0750 | 0.0083 | 0.0363 |
| Bf/f | 1.000 | 0.959 | 0.976 | 0.950 |

| | Embodiments | | | |
|---|---|---|---|---|
| Conditions | 9 | 10 | 11 | 12 |
| (Values of factors of conditions: No. 3) | | | | |
| f1/f | −2.066 | −1.419 | −1.793 | −1.867 |
| f2/f | 0.746 | 0.726 | 0.743 | 0.710 |
| r1/r2 | 1.845 | 2.097 | 2.014 | 1.871 |
| r3/r4 | 0.345 | 0.188 | 0.269 | 0.145 |
| d2/f | 0.420 | 0.414 | 0.402 | 0.409 |
| n4 | 1.797 | 1.835 | 1.797 | 1.788 |
| r7/r8 | −1.074 | −0.864 | −1.018 | −1.417 |
| d3/f | 0.227 | 0.293 | 0.280 | 0.280 |
| d6/f | 0.014 | 0.012 | 0.014 | 0.025 |
| ν1 | 54.62 | 53.95 | 54.62 | 54.62 |
| ν2−ν4 | 0 | 4.56 | 2.11 | 0 |
| n4−n2 | 0 | 0.0470 | 0.0087 | 0 |
| Bf/f | 0.944 | 0.994 | 0.944 | 0.944 |

Description of Lens System of Type II

A description will now be given of the lens system of type II in accordance with the present invention.

In the lens system of the type II in accordance with the present invention, conditions (101) and (102) are posed to simultaneously attain suitable back focus length and compact construction, while correcting distortion and astigmatism which are factors impeding widening of view angle of the lens system, by optimizing the share of the refractive power between the negative meniscus lens $L_1$ and the positive meniscus lens $L_2$.

When the upper limit of the condition (101) is exceeded, it becomes difficult to correct the negative distortion although the required back focus length is obtained. Conversely, when the focal distance f1 is reduced below the lower limit of the condition (101), the back focus is impractically shortened to make is difficult to obtain the desired marginal luminance.

The condition (102) is intended for correcting the distortion and astigmatism. When the focal distance f2 is increased beyond the upper limit of this condition, it becomes difficult to correct the distortion. Conversely, when the focal distance f2 is reduced below the lower limit of the condition (102), it becomes difficult to correct astigmatism and to obtain the required length of the back focus.

The conditions (103) and (104) are posed for the purpose of effecting, with a greater degree of balance, correction of astigmatism which is an important factor for widening of the view angle.

Referring first to the condition (103), this condition determines the optimum lens configuration of the positive meniscus lens $L_2$ with the object-side surface directed to the object. If the ratio r3/r4 is reduced below the lower limit of this condition, negative astigmatism is generated to cause the longitudinal image to strongly concave towards the object, because the curvature of the image-side surface of the positive meniscus lens $L_2$ becomes smaller. Conversely, when the upper limit of the condition (103) is exceeded, the curvature of the image-side surface of the positive meniscus lens is increased so that the longitudinal image is strongly projected towards the object. Thus, the image forming performance is seriously deteriorated in either case.

The thickness d3 of the positive meniscus lens $L_2$ as measured on the optical axis should be considerably large as compared with the thickness d7 of the double-side-convex lens $L_4$ as measured on the optical axis, otherwise appreciable correction of astigmatism over the entire extra-axis region becomes difficult, resulting in large astigmatism remaining in the central or marginal regions of the view angle.

The condition (104) determines the optimum range of the ratio of the axial lens thickness between the positive meniscus lens $L_2$ having the convex surface directed toward the object and the double-side-convex positive lens $L_4$. If the ratio is below the range of the condition (104), it is difficult to correct astigmatism appreciably well. Conversely, when the upper limit of this condition is exceeded, the thickness of the positive meniscus lens $L_2$ is increased to cause an increase in the size of the whole lens system.

The condition (105) is for determining the optimum air gap size between the negative meniscus lens $L_1$ and the positive meniscus lens $L_2$, for the purpose of correcting coma aberration while reducing the size of the lens system. Lens thickness d2 exceeding the upper limit of the condition (105) provides a sufficiently large length of the back focus but undesirably increases the size of the lens system, due to increase in the height of the rays of the maximum view angle incident to the negative meniscus lens $L_1$. Conversely, lens thickness d2 below the lower limit of the condition (105) makes it difficult to correct the coma aberration.

In order to improve the image forming performance in the marginal region, it is necessary not only that the astigmatism and the coma aberration are corrected but also that the image curvature is corrected. In this case, it is preferred that the following condition (106) is met:

$$1.76 < n4 \quad (106)$$

wherein n4 represents the refractive index of the double-side-convex lens $L_4$ with respect to the d ray ($\lambda = 587.6$ nm). If the refractive index n4 is below the value specified by the condition (106), the Petzvar sum is increased in the positive side, making it difficult to effectively correct the image curvature.

In order to effect extremely good correction of spherical aberration and color aberration, it is desirable that the following conditions (107) and (108) are met:

$$-0.65f < r8 < -0.58\ f \quad (107)$$

$$-5 < \nu2 - \nu4 < 8 \quad (108)$$

wherein f represents the foal distance of the whole lens system, r8 represents the radius of curvature of the image-side surface of the double-side-convex positive lend $L_4$, $\nu2$ and $\nu4$ respectively represent Abbe numbers of the positive meniscus lens $L_2$ and the double-side-convex lens $L_4$, and d3 and d7 respectively represent the thicknesses of the positive meniscus lens $L_2$ and the double-side-convex lens $L_4$ as measured on their optical axes.

The condition (107) pertains to correction of spherical aberration. The curvature radius r8 exceeding the upper limit of the condition (107) causes an insufficiency of the spherical aberration, whereas a radius r8 below the lower limit of the condition (107) causes an excessive correction.

The condition (108) is posed for the purpose of effectively correcting color aberrations on the optical axis and in the extra-axis regions with good balance. When the difference ($2\nu - 4\nu$) is increased beyond the upper limit of the condition (108), correction of extra-axis color aberration becomes insufficient as compared with the correction of the color aberration on the optical axis. Conversely, when the difference ($2\nu - 4\nu$) is reduced to a value below the lower limit of the condition (108), the correction of extra-axis aberration becomes excessive.

In order to attain a sufficient correction of aberrations, it is preferred that the following conditions are further met:

$$0.36f < r2 < 0.43f \quad (109)$$

$$-0.57 < r3/r5 < -0.5 \quad (110)$$

wherein f represents the focal distance of the whole lens system, r2 represents the radius of curvature of the image-side surface of the negative meniscus lens $L_1$, r3 represents the radius of curvature of the object-side surface of the positive meniscus lens $L_2$, and r5 represents the radius of curvature of the object-side surface of the double-side-concave lens $L_3$.

The condition (109) pertains to correction of distortion and coma aberration. When the radius r2 of curvature exceeds the upper limit of the condition (109), it is difficult to effect the correction of the distortion, whereas, when the curvature radius r2 is below the lower limit of the condition (109), inward coma aberration is seriously increased to degrade the performance in full-aperture exposure.

The condition (110) is intended for an efficient correction of coma aberration with a good balance. Values of the ratio r3/r5 above or below the upper and lower limits of the condition (110) makes it correct coma aberration in the intermediate range of view angle.

Preservation of adequate length of back focus is advantageous in attaining a multi-focus lens system and is necessary for obtaining required marginal luminance.

It is therefore preferred that the following condition (111) is met:

$$0.85f < Bf < 0.98f \quad (111)$$

wherein Bf represents the length of back focus suitable for lens-shutter-type cameras, while f represents the focal length of the total lens system.

If th back focus length is below the lower limit of this condition, it is impossible to obtain the required marginal luminance. On the other hand, a back focus length exceeding the upper limit of this condition makes it difficult to obtain a compact construction and to effect correction of aberrations.

Figure 13:
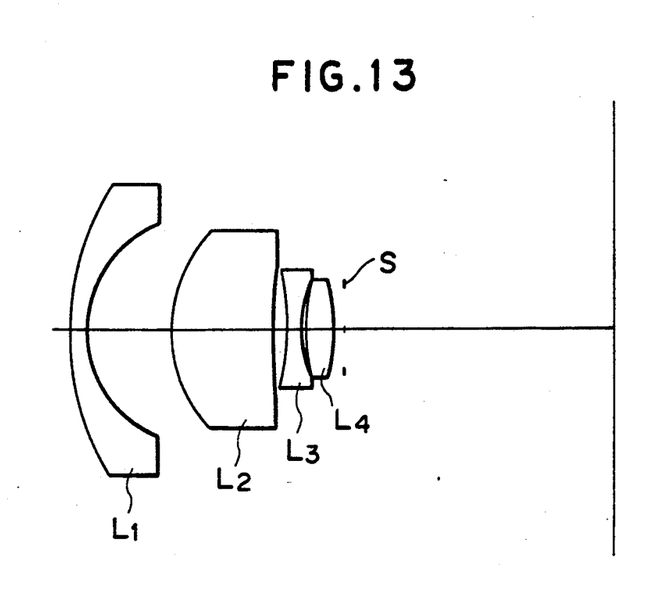
Figure 14:
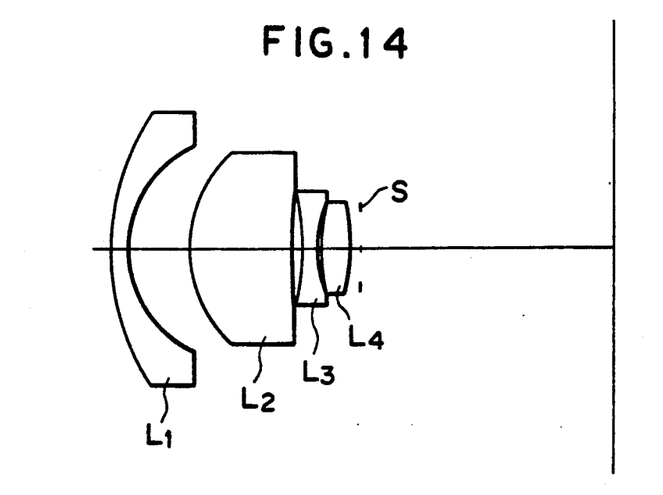
Figure 15:
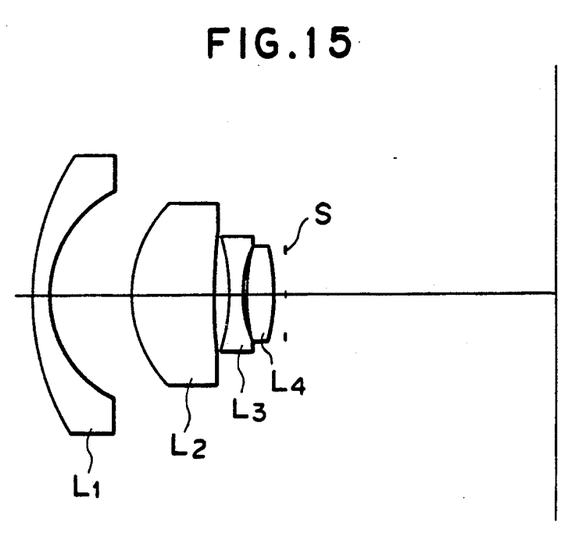
Figure 16:
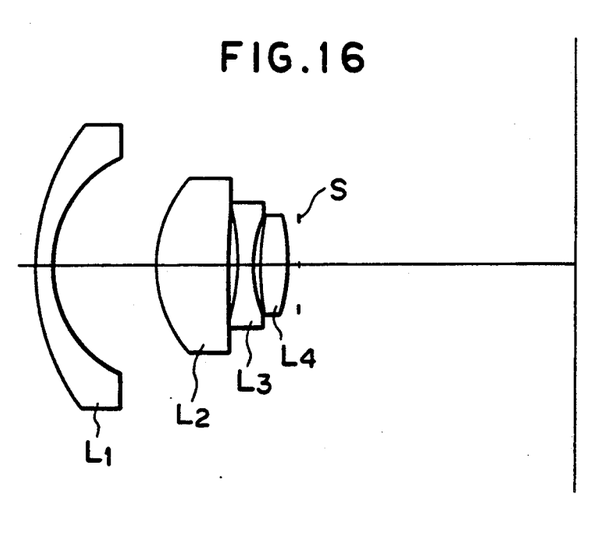
Figure 17:
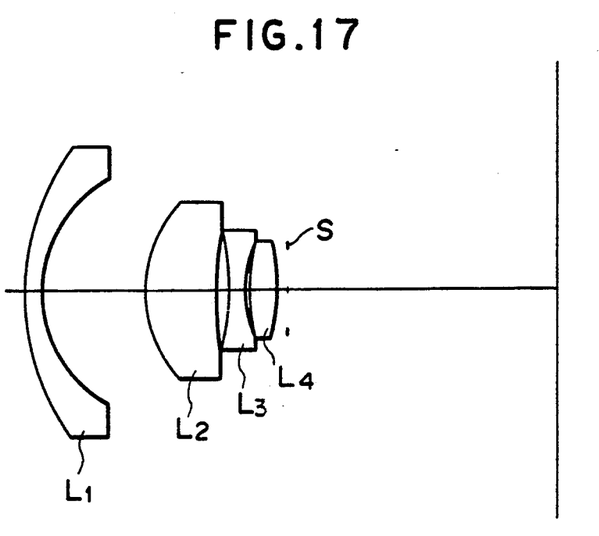
Figure 18:
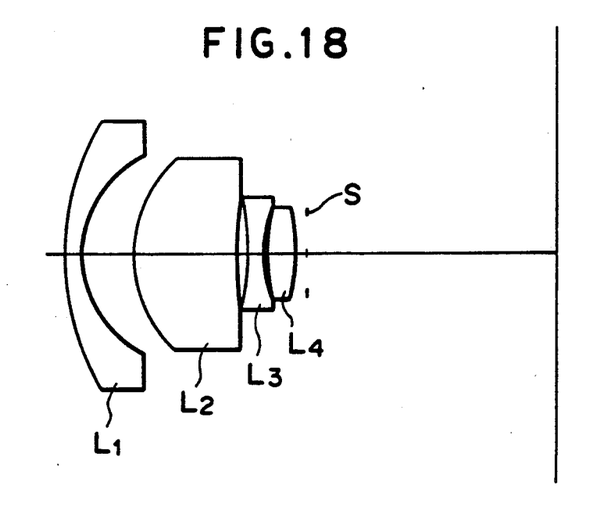

Data of thirteenth to eighteenth embodiments of the lens system of the invention, belonging to the type II, are shown in the following Tables 13 to 18. The constructions of these lens systems are shown in FIGS. 13 to 18.

TABLE 13

(Thirteenth Embodiment)
f = 100.00  Bf = 94.47  FN = 3.5  2A = 74.4°

|   | r | d | ν | n |
|---|---|---|---|---|
| 1 | 94.682 | 5.59 | 54.6 | 1.51454 |
| 2 | 39.108 | 27.97 | | |
| 3 | 48.578 | 34.96 | 49.4 | 1.77279 |
| 4 | 296.526 | 4.20 | | |
| 5 | −95.629 | 5.24 | 30.1 | 1.69895 |
| 6 | 44.193 | 1.40 | | |
| 7 | 70.009 | 9.44 | 45.4 | 1.79668 |
| 8 | −64.326 | (Bf) | | |

TABLE 14

(Fourteenth Embodiment)
f = 100.00  Bf = 87.42  FN = 3.5  2A = 73.2°

|   | r | d | ν | n |
|---|---|---|---|---|
| 1 | 84.173 | 5.59 | 49.1 | 1.53172 |
| 2 | 37.817 | 20.98 | | |
| 3 | 44.587 | 34.96 | 49.4 | 1.77279 |
| 4 | 266.719 | 3.50 | | |
| 5 | −87.565 | 5.24 | 29.5 | 1.71736 |
| 6 | 43.784 | 1.40 | | |
| 7 | 74.402 | 9.79 | 43.3 | 1.84042 |
| 8 | −63.616 | (Bf) | | |

TABLE 15

(Fifteenth Embodiment)
f = 100.00  Bf = 94.41  FN = 3.5  2A = 74.0°

|   | r | d | ν | n |
|---|---|---|---|---|
| 1 | 86.599 | 5.59 | 64.1 | 1.51680 |
| 2 | 39.120 | 27.97 | | |
| 3 | 43.933 | 27.97 | 52.3 | 1.74810 |
| 4 | 249.577 | 4.55 | | |
| 5 | −78.434 | 4.89 | 30.1 | 1.69895 |
| 6 | 42.756 | 1.40 | | |
| 7 | 71.610 | 9.09 | 45.4 | 1.79668 |
| 8 | −59.577 | (Bf) | | |

TABLE 16

(Sixteenth Embodiment)
f = 100.00   Bf = 97.17   FN = 3.5   2A = 75.0°

| | r | d | ν | n |
|---|---|---|---|---|
| 1 | 79.083 | 5.59 | 64.1 | 1.51680 |
| 2 | 40.458 | 34.96 | | |
| 3 | 45.675 | 24.47 | 45.4 | 1.79668 |
| 4 | 425.901 | 2.80 | | |
| 5 | −89.259 | 5.24 | 29.5 | 1.71736 |
| 6 | 45.878 | 2.80 | | |
| 7 | 113.670 | 9.44 | 49.4 | 1.77279 |
| 8 | −58.709 | (Bf) | | |

TABLE 17

(Seventeenth Embodiment)
f = 100.00   Bf = 94.10   FN = 3.5   2A = 74.2°

| | r | d | ν | n |
|---|---|---|---|---|
| 1 | 82.173 | 5.59 | 64.1 | 1.51680 |
| 2 | 42.606 | 34.96 | | |
| 3 | 43.293 | 24.47 | 52.3 | 1.74810 |
| 4 | 163.340 | 4.20 | | |
| 5 | −80.769 | 5.24 | 32.2 | 1.67270 |
| 6 | 40.774 | 1.40 | | |
| 7 | 66.410 | 9.44 | 49.4 | 1.77279 |
| 8 | −62.305 | (Bf) | | |

TABLE 18

(Eighteenth Embodiment)
f = 100.00   Bf = 87.38   FN = 3.5   2A = 73.4°

| | r | d | ν | n |
|---|---|---|---|---|
| 1 | 88.928 | 5.59 | 49.1 | 1.53172 |
| 2 | 36.407 | 17.48 | | |
| 3 | 42.689 | 34.97 | 49.4 | 1.77279 |
| 4 | 219.432 | 3.50 | | |
| 5 | −82.829 | 5.24 | 29.5 | 1.71736 |
| 6 | 41.785 | 1.05 | | |
| 7 | 64.439 | 9.79 | 43.3 | 1.84042 |
| 8 | −62.104 | (Bf) | | |

Values of the factors of the aforementioned conditions in each of the thirteenth to eighteenth embodiments are shown in the following Table 19.

TABLE 19

(Values of factors of conditions: No. 1)

| | Embodiments | | | | | |
|---|---|---|---|---|---|---|
| Conditions | 13 | 14 | 15 | 16 | 17 | 18 |
| f1/f | −1.341 | −1.348 | −1.438 | −1.686 | −1.799 | −1.204 |
| f2/f | 0.708 | 0.648 | 0.674 | 0.624 | 0.724 | 0.631 |
| r3/r4 | 0.164 | 0.167 | 0.176 | 0.107 | 0.265 | 0.195 |
| d3/d7 | 3.704 | 3.571 | 3.077 | 2.593 | 2.593 | 3.571 |
| d2/f | 0.280 | 0.210 | 0.280 | 0.350 | 0.350 | 0.175 |
| n4 | 1.797 | 1.840 | 1.797 | 1.773 | 1.773 | 1.840 |
| r8/f | −0.643 | −0.636 | −0.596 | −0.587 | −0.623 | −0.621 |
| ν2−ν4 | 4.02 | 6.14 | 6.86 | −4.02 | 2.84 | 6.14 |
| r2/f | 0.391 | 0.378 | 0.391 | 0.405 | 0.426 | 0.364 |
| r3/r5 | −0.508 | −0.509 | −0.560 | −0.512 | −0.536 | −0.515 |
| Bf/f | 0.945 | 0.874 | 0.944 | 0.972 | 0.941 | 0.874 |

From the data of the embodiments shown in Tables 1 to 18, it will be understood that, in the lens systems of the types I and II in accordance with the present invention, the overall lengths of the lens systems and the diameters of the front lens are maintained to be sufficiently small, thus attaining a reduction in the size of the lens system despite the widening of the view angle.

In the embodiments described hereinbefore, a better short-distance focusing performance is attained by advancing the lenses $L_1$ to $L_4$ as a unit while fixing the stop S. This, however, is only illustrative and the arrangement may be such that the stop S is moved as a unit with the lenses $L_1$ to $L_4$ as will be obvious to those skilled in the art. It is also possible to conduct focusing by moving the lenses $L_1$ to $L_4$ or only the lens $L_1$.

As will be understood from the foregoing description, according to the present invention, it is possible to obtain a behind stop wide angle lens which has a view angle as large as 74° to 90° with a simple 4-group 4-lens construction.

In addition, the widening of the view angle is achieved while reducing the overall length of the lens system and the diameter of the front lens, thus realizing a compact construction of the whole lens system.

Furthermore, the lens system of the present invention enables an easy variation of the focal distance with the air of a rear converter, by virtue of the behind stop type construction, thus coping with the demand for multi-focus arrangement of photographing lens.

What is claimed is:

1. A behind stop wide angle lens system, comprising, arranged from the end adjacent an object towards the end adjacent the image, a negative meniscus lens $L_1$ having a convex surface directed to the object, a positive meniscus lens $L_2$ having a convex surface directed to said object, a double-side-concave negative lens $L_3$ having both surfaces concaved, a double-side-convex positive lens $L_4$ having both surfaces convexed, and a stop S, said lenses satisfying the following conditions (1) to (4):

$$-2.8\,f < f1 < -1.3\,f \quad (1)$$

$$0.7\,f < f2 < 0.82\,f \quad (2)$$

$$1.5 < r1/r2 < 2.3 \quad (3)$$

$$0.13 < r3/r4 < 0.4 \quad (4)$$

wherein f represents the focal distance of the whole lens system, f1 represents the focal distance of said negative meniscus lens $L_1$, f2 represents the focal distance of said positive meniscus lens $L_2$, r1 and r2 respectively represent the radii of curvature of the object-side surface and the image-side surface of said negative meniscus lens $L_1$, and r3 and r4 respectively represent the radii of curvature of the object-side surface and the image-side surface of said positive meniscus lens $L_2$.

2. A behind stop wide angle lens system according to claim 1, further satisfying the following condition (5):

$$0.4\,f < d2 < 0.55\,f \quad (5)$$

wherein d2 represents the size of the air gap between said negative meniscus lens $L_1$ and said positive meniscus lens $L_2$ as measured on the optical axis.

3. A behind stop wide angle lens system according to claim 1, further satisfying the following condition (6):

$$1.77 < n4 \quad (6)$$

wherein n4 represents the refractive index of the double-side-convex lens $L_4$ with respect to the d ray (λ = 587.6 nm).

4. A behind stop wide angle lens system according to claim 1, further satisfying the following conditions (7) to (9):

$$-1.5 < r7/r8 < -0.7 \quad (7)$$

$$0.17f < d3 - 0.36f \quad (8)$$

$$0.01f < d6 < 0.026f \quad (9)$$

wherein r7 and r8 represent the radii of curvatures of the object-side and image-side surfaces of the double-side-convex positive lens $L_4$, d3 represents the thickness of the positive meniscus lens $L_2$ as measured on the optical axis, and d6 represents the air gap size between the double-side-concave negative lens $L_3$ and the double-side-convex positive lens $L_4$ as measured on the optical axis.

5. A behind stop wide angle lens according to claim 1, further satisfying the following conditions (10) (10) (11):

$$51 < \nu1 < 70 \quad (10)$$

$$-2 < \nu2 - \nu4 < 8 \quad (11)$$

wherein $\nu1$ is the Abbe number of the negative meniscus lens $L_1$, while $\nu2$ and $\nu4$ respectively represent the Abbe numbers of the positive meniscus lens $L_2$ and the double-side-convex lens $L_4$.

6. A behind stop wide angle lens system according to claim 1, further satisfying the following condition (12):

$$-0.01 < n4 - n2 < 0.09 \quad (12)$$

wherein n2 and n4, respectively, are refractive index values of the positive meniscus lens $L_2$ and the double-side-convex positive lens $L_4$ with respect to the d rays ($\lambda = 587.6$ nm).

7. A behind stop wide angle lens system according to claim 1, further satisfying the following condition (13):

$$0.9f < Bf < 1.1f \quad (13)$$

where, Bf represents the length of the back focus.

8. A behind stop wide angle lens system, comprising, arranged from the end adjacent an object towards the image, a negative meniscus lens $L_1$ having a convex surface directed towards said object, a positive meniscus lens $L_2$ having a convexed surface directed towards said object, a double-side-concave lens $L_3$ having both surfaces concaved, a double-side-convex lens $L_4$ having both surfaces convexed, and a stop S, wherein the following condition (4) is met:

$$0.13 < r3/r4 < 0.4 \quad (4)$$

wherein r3 and r4 respectively represent the radii of curvature of the object-side surface and the image-side surface of said positive meniscus lens $L_2$.

9. A behind stop wide angle lens system according to claim 8, further satisfying the following condition (2):

$$0.7f < f2 < 0.82f \quad (2)$$

wherein f represents the focal distance of the whole lens system, and f2 represents the focal distance of said positive meniscus lens $L_2$.

10. A behind stop wide angle lens system, comprising, arranged from the end adjacent an object toward the end adjacent the image, a negative meniscus lens $L_1$ having a convex surface directed toward said object, a positive meniscus lens $L_2$ having a convex surface directed toward said object, a double-side-concave negative lens $L_3$ having both sides concaved, a double-side-convex lens $L_4$ having both sides convexed, and a stop S, said lenses satisfying the following conditions:

$$-1.9f < f1 < -1.2f \quad (101)$$

$$0.6f < f2 < 0.74f \quad (102)$$

$$0.1 < r3/r4 < 0.28 \quad (108)$$

$$2.5 < d3/d7 < 3.8 \quad (104)$$

$$0.17f < d2 < 0.37f \quad (105)$$

wherein f represents the focal distance of the whole lens system, f1 represents the focal distance of the first lens, f2 represents the focal distance of the positive meniscus lens $L_2$, r3 and r4 respectively represent the radii of curvatures of the object-side surface and the image-side surface of the positive meniscus lens $L_2$, d3 represents the thickness of the positive meniscus lens $L_2$ as measured on the optical axis of the lens, d7 represents the thickness of the positive lens $L_4$ as measured on the optical axis of this lens, and d2 represents the size of the air gap between the negative meniscus lens $L_1$ and the positive meniscus lens $L_2$ as measured on the optical axis.

11. A behind stop wide angle lens system according to claim 10, further satisfying the following condition (106)

$$1.76 < n4 \quad (106)$$

wherein n4 represents the d refractive index of said double-side-convex positive lens $L_4$ with respect to the ray ($\lambda = 587.6$ nm).

12. A behind stop wide angle lens system according to claim 10, further satisfying the following conditions (107) and (108):

$$-0.65f < r8 < -0.58f \quad (107)$$

$$-5 < \nu2 - \nu4 < 8 \quad (108)$$

wherein r8 represents the radius of curvature of the image-side surface of the double-side-convex positive lens $L_4$, $\nu2$ and $\nu4$ respectively represent Abbe numbers of the positive meniscus lens $L_2$ and the double-side-convex lens $L_4$.

13. A behind stop wide angle lens system according to claim 10, further satisfying the following conditions (109) and (110):

$$0.36f < r2 < 0.43f \quad (109)$$

$$-0.57 < r3/r5 < -0.5 \quad (110)$$

wherein r2 represents the radius of curvature of the image-side surface of the negative meniscus lens $L_1$, r3 represents the radius of curvature of the object-side surface of the positive meniscus lens $L_2$, and r5 represents the radius of curvature of the object-side surface of the double-side-concave lens $L_3$.

14. A behind stop wide angle lens system according to claim 10, further satisfying the following condition (111):

$$0.85f < Bf < 0.98f \quad (111)$$

wherein Bf represents the length of the back focus.

15. A behind stop wide angle lens system, comprising, arranged from the side adjacent an object towards the end adjacent the image, a negative meniscus lens $L_1$ having a convex surface directed toward said object, a positive meniscus lens $L_2$ having a convex surface directed toward said object, a double-side-concave negative lens $L_3$ having both sides concaved, a double-side convex positive lens $L_4$ having both sides convexed, and a stop S, said lens satisfying the following condition (104):

$$2.5 < d3/d7 < 3.8 \quad (104)$$

wherein d3 represents the thickness of said positive meniscus lens $L_2$ as measured on the optical axis thereof and d7 represents the thickness of said double-side-convex lens $L_4$ as measured on the optical axis thereof.

* * * * *